United States Patent
Komatsu

(10) Patent No.: US 8,281,267 B2
(45) Date of Patent: Oct. 2, 2012

(54) CIRCUIT DESIGN SUPPORT APPARATUS, CIRCUIT DESIGN SUPPORT METHOD, AND CIRCUIT DESIGN SUPPORT PROGRAM

(75) Inventor: Hiroaki Komatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 153 days.

(21) Appl. No.: 12/856,103

(22) Filed: Aug. 13, 2010

(65) Prior Publication Data

US 2011/0041114 A1 Feb. 17, 2011

(30) Foreign Application Priority Data

Aug. 17, 2009 (JP) ................................. 2009-188420

(51) Int. Cl.
*G06F 17/50* (2006.01)

(52) U.S. Cl. ........... 716/108; 716/113; 716/134; 703/16

(58) Field of Classification Search .................. 716/108, 716/113, 134; 703/16
See application file for complete search history.

(56) References Cited

U.S. PATENT DOCUMENTS

| 7,239,997 | B2 | 7/2007 | Yonezawa |
| 7,428,716 | B2 | 9/2008 | Visweswariah |
| 7,706,911 | B2 | 4/2010 | Sugiyama |
| 7,992,114 | B1 * | 8/2011 | Adams et al. ................. 716/110 |
| 2004/0243964 | A1 * | 12/2004 | McElvain et al. ............... 716/12 |
| 2006/0248485 | A1 * | 11/2006 | Foreman et al. .................. 716/6 |
| 2007/0089074 | A1 * | 4/2007 | Ramachandran et al. ........ 716/2 |
| 2007/0226671 | A1 * | 9/2007 | Hirata ............................. 716/6 |
| 2007/0234252 | A1 * | 10/2007 | Visweswariah et al. .......... 716/6 |
| 2008/0072198 | A1 * | 3/2008 | Celik et al. ........................ 716/6 |
| 2008/0209376 | A1 * | 8/2008 | Kazda et al. ...................... 716/6 |
| 2008/0295050 | A1 * | 11/2008 | Maeda et al. ..................... 716/6 |
| 2009/0019408 | A1 | 1/2009 | Saito et al. |
| 2009/0024974 | A1 | 1/2009 | Yamada |
| 2011/0289465 | A1 * | 11/2011 | Adams et al. ................. 716/113 |

FOREIGN PATENT DOCUMENTS

| JP | 2004-252831 A | 9/2004 |
| JP | 2005-92885 A | 4/2005 |
| JP | 2008-16748 A | 1/2008 |
| JP | 2008-112406 A | 5/2008 |
| JP | 2009-21378 A | 1/2009 |
| JP | 2009-25914 A | 2/2009 |
| WO | WO-2004/046975 | 6/2004 |

* cited by examiner

*Primary Examiner* — Phallaka Kik
(74) *Attorney, Agent, or Firm* — Fujitsu Patent Center

(57) ABSTRACT

A circuit design support apparatus for supporting design of a semiconductor integrated circuit includes an upper limit path delay determining unit that sorts circuit paths included in the semiconductor integrated circuit by probability distributions for the delay values of the circuit paths, selects a worst path having a largest delay value in the circuit paths, and determines a maximum delay value as an upper limit path delay value that does not affect an operational timing of the semiconductor integrated circuit, a cell size optimization processor that replaces cells by modifying their cell sizes on the basis of the upper limit path delay value, and a critical path determining unit that determines critical paths that are capable of affecting the upper limit path delay value if the cell size optimization processor replaces cells included in the circuit paths.

18 Claims, 10 Drawing Sheets

CIRCUIT DESIGN SUPPORT APPARATUS, CIRCUIT DESIGN SUPPORT METHOD, AND CIRCUIT DESIGN SUPPORT PROGRAM

CROSS-REFERENCE TO RELATED APPLICATION(S)

This application is based upon and claims priority to prior Japanese Patent Application No. 2009-188420, filed on Aug. 17, 2009, in the Japan Patent Office, the entire contents of which are incorporated herein by reference.

FIELD

The present invention relates to a circuit design support apparatus, a circuit design support method, and a circuit design support program.

BACKGROUND

The performance of a semiconductor integrated circuit, such as a large scale integrated circuit (LSI), largely depends on its operational timings, which are based on the cycle time (i.e., the inverse of the operational frequency). When designing an integrated circuit, the circuit is designed such that the delay values, racing values, and other operational timing indices fall within design target values for all paths on the circuit. In other words, the circuit is designed such that its operational frequency is at least a design target value. Methods for increasing the operational frequency of paths may include logic modifications, layout improvements, and suppression of line resistance, for example, as well as increasing the drivability of cells. The "operational frequency" referred to herein is the upper limit value of the clock frequency of the circuit at which operation is possible. In addition, the "cycle time" refers to the period of one clock cycle at the limit frequency of the circuit at which operation is possible. The cycle time is computed by taking the inverse of the upper limit operational frequency. Furthermore, the "operational timing" refers to the delay values, racing values, and other design indices that all paths on the circuit should meet within the target operational frequency.

There exists technology for optimizing the drivability of cells for set paths, and achieving a target operational frequency.

In addition, there exists statistical static timing analysis (SSTA), wherein delays occurring in individual cells on a path are treated as probability distributions, and the operational frequencies of paths are statistically analyzed.

However, if the drivability of cells is raised by increasing the cell size, power consumption of the cells also increases. In other words, there is a trade-off between power consumption, and the operational frequency or the cycle time (i.e., the inverse of the operational frequency).

When optimizing a circuit such that the operational frequencies of individual paths achieve a target operational frequency, the cycle times of individual paths become concentrated near the cycle time corresponding to the target operational frequency. For the subset of paths on the circuit that do not achieve the target cycle time (i.e., the inverse of the target operational frequency), the drivability of cells is raised until the target cycle time for the subset of paths is achieved. Meanwhile, for the paths that do satisfy the target cycle time, the cell size might be further increased to obtain a delay margin. However, such paths are not replaced with larger cells having higher drivability in such cases, due to considerations from the perspective of power consumption and chip size.

Some cells may have input terminals connected to the output terminals of a plurality of cells. Such cells are used on a plurality of paths, and are thus shared by a plurality of paths. For such a cell, the actual delay produced during cell operation may increase beyond the maximum static delay between that cell's input terminals and output terminals. For this reason, in cases where there are many paths near the target operational frequency (i.e., in cases where there are many paths with small margins with respect to the target cycle time), there is a possibility that an actually fabricated semiconductor integrated circuit with such paths may not operate at the target operational frequency, due to the effects of delays in cells shared by a plurality of paths.

With semiconductor integrated circuits, a plurality of circuits is simultaneously formed on a silicon wafer. In some cases, however, irregularities in fabrication precision may occur, depending on the position of the circuits on the silicon wafer. For this reason, depending on the position of the circuits on the silicon wafer, there might be produced circuits that do achieve the target operational frequency, as well as circuits that do not achieve the target operational frequency, even when fabricating semiconductor integrated circuits with the same design. Such fabrication irregularities increase with increases in the number of paths with small margins in operational frequency. For this reason, when there are many paths with small margins, the timing yield (i.e., frequency yield) drops.

When optimizing cell sizes and cell drivability for power consumption and delay margins in this way, there is demand to optimize by replacing cells with larger cells having higher drivability, but without producing paths where the operational frequency or the cycle time drops.

Thus, the realization of technology to support such optimization is an important issue. Such technology needs to support the optimization of cell size or cell drivability without affecting the operational frequency or the cycle time of the circuit as a whole.

[Patent Document 1] Japanese Laid-open Patent Publication No. 2008-16748
[Patent Document 2] Japanese Laid-open Patent Publication No. 2004-252831
[Patent Document 3] Japanese Laid-open Patent Publication No. 2005-92885
[Patent Document 4] Japanese Laid-open Patent Publication No. 2008-112406
[Patent Document 5] Japanese Laid-open Patent Publication No. 2009-21378
[Patent Document 6] Japanese Laid-open Patent Publication No. 2009-25914
[Patent Document 7] International Publication No. 2004/046975

SUMMARY

According to an aspect of the invention, a circuit design support apparatus for supporting design of a semiconductor integrated circuit includes an upper limit path delay determining unit that sorts circuit paths included in the semiconductor integrated circuit by probability distributions for the delay values of the circuit paths, selects a worst path having a largest delay value in the circuit paths and determines a maximum delay value as an upper limit path delay value that does not affect an operational timing of the semiconductor integrated circuit, a cell size optimization processor that replaces or modifies cells to alter their cell sizes on the basis of the upper limit path delay value, and a critical path determining unit that determines critical paths that are capable of affecting the upper limit path delay value if the cell size optimization processor modifies or replaces cells included in the circuit paths.

The object and advantages of the invention will be realized and attained by at least those elements, features, and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments of the circuit design support apparatus, circuit design support method, and circuit design support program disclosed herein will be described in detail and with reference to the accompanying drawings. However, it should be appreciated that the technology disclosed herein is not limited to these embodiments.

Figure 1:
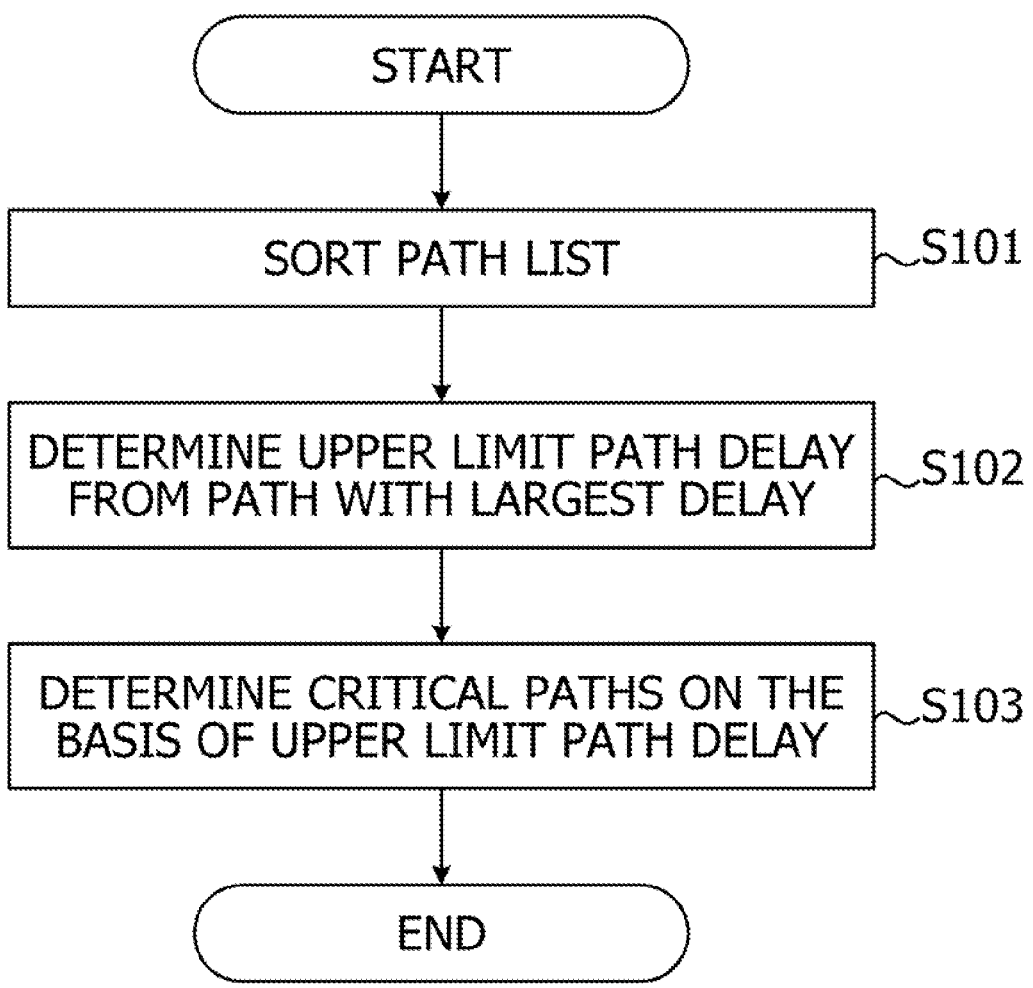
FIG. 1 is an exemplary flowchart of the circuit design support method of the first embodiment.

FIG. 1 is an exemplary flowchart of the circuit design support method of the first embodiment. The circuit design support method in accordance with the first embodiment includes the following operations: sorting (S101); determining the upper limit path delay (S102); and determining the critical paths (S103).

In the sorting operation (S101), paths from a list of the paths within a semiconductor integrated circuit are sorted by delay value, on the basis of probability distributions for delays produced when respective paths are operable at the target operational frequency. In the operation for determining the upper limit path delay (S102), the sorted results from the sorting operation (S101) for the paths within the semiconductor integrated circuit are referenced, and on the basis of the probability distribution for the worst path where the delay value is largest, the upper limit delay is determined for a path operation that does not affect the operational timing of the semiconductor integrated circuit as a whole. This delay value is set as the upper limit path delay.

In the operation for determining critical paths (S103), the upper limit path delay is used as a basis for determining paths that may possibly affect the operational timing of the semiconductor integrated circuit as a whole if cells on those paths were to be replaced with smaller cells having low drivability. These paths are set as critical paths.

By use of this circuit design support method, constraint parameters are obtained whereby cell sizes can be optimized without affecting the operational timing of the circuit as a whole. More specifically, the constraint parameters specify constraints such that: cell sizes are not decreased for cells included on critical paths; and when decreasing the cell size for cells not included on critical paths, the delay of paths that include such cells is not made to exceed the upper limit path delay.

By use of such constraint parameters, power consumption can be reduced, and margins can be acquired by dispersing paths that are concentrated near the target operational frequency.

One problem that occurs as a result of a concentration of path operational frequencies will now be described. Some cells may have input terminals connected to the output terminals of a plurality of cells. Such cells are used on a plurality of paths, and are thus shared by a plurality of paths. For such a cell, the actual delay produced during cell operation may increase beyond the maximum static delay between input terminals and output terminals of the cell. The output delay distribution for a cell receiving a plurality of inputs can be computed by statistical operations, using what may be referred to as statistical Max operations. With statistical Max operations, the output f(t) of a cell that has received two inputs with the delay probability distributions $F_1(t)$ and $F_2(t)$ becomes $f(t)=dt(F_1(t),F_2(t))/dt$, and $F_i$ becomes the cumulative probability function of $f_i$.

Figure 2:
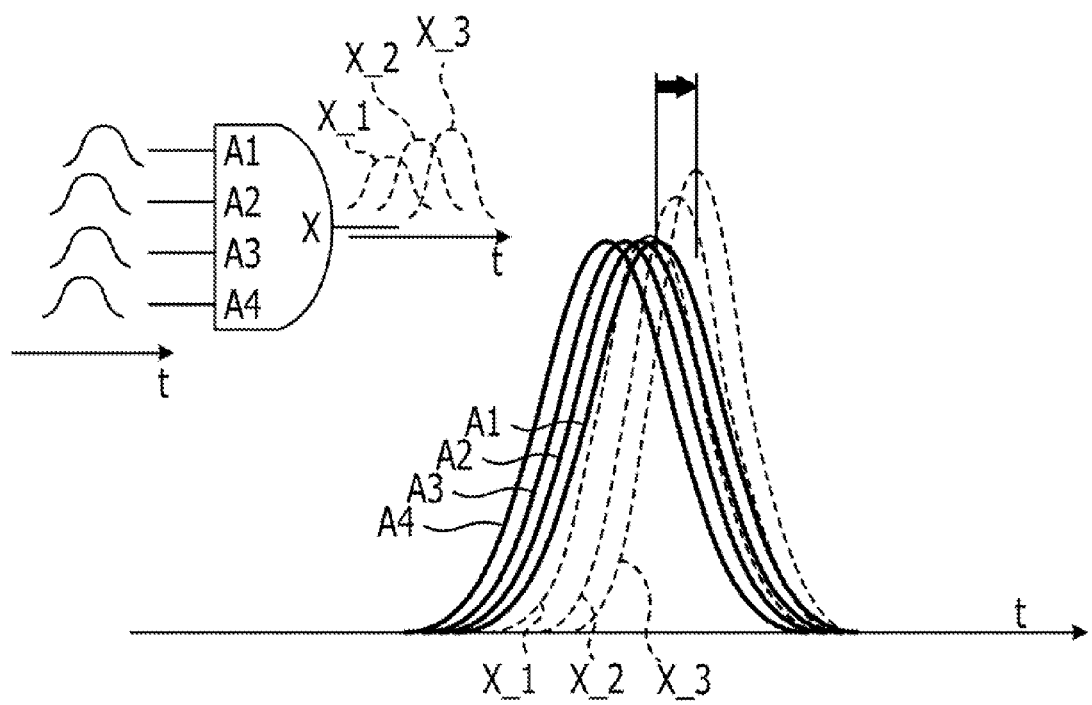
FIG. 2 is an example of delay distributions in a 4-input, 1-output cell.

FIG. 2 is an example of delay distributions in a cell that receives signals from four input terminals as inputs, and outputs a signal from one output terminal. By way of example, FIG. 2 illustrates the case where the cell is designed to output X from its output terminal after receiving signal inputs from its four input terminals A1 to A4. The inputs are ordered A1, A2, A3, A4 in terms of delay magnitude.

In the case where the cell receives signal inputs from the input terminal A4 with the smallest delay as well as from the input terminal A4 with the next-smallest delay, the output delay distribution is X_1. Subsequently, the cell receives a signal input from the input terminal A2, and its output delay distribution is X_2. The cell then receives a signal input from the input terminal A1, and its output delay distribution is X_3.

In this way, when there is signal input into a cell having a plurality of input terminals, the output delay distribution becomes greater than the signal input delay distribution for the slowest input terminal. For this reason, if there are many paths near the target cycle time (i.e., if there are many paths with small margins), there will be delays at cells shared by paths with small margins, due to the cells being used by the paths with small margins. As a result of these delays, it is possible that the target operational frequency will not be achieved.

Figure 3:
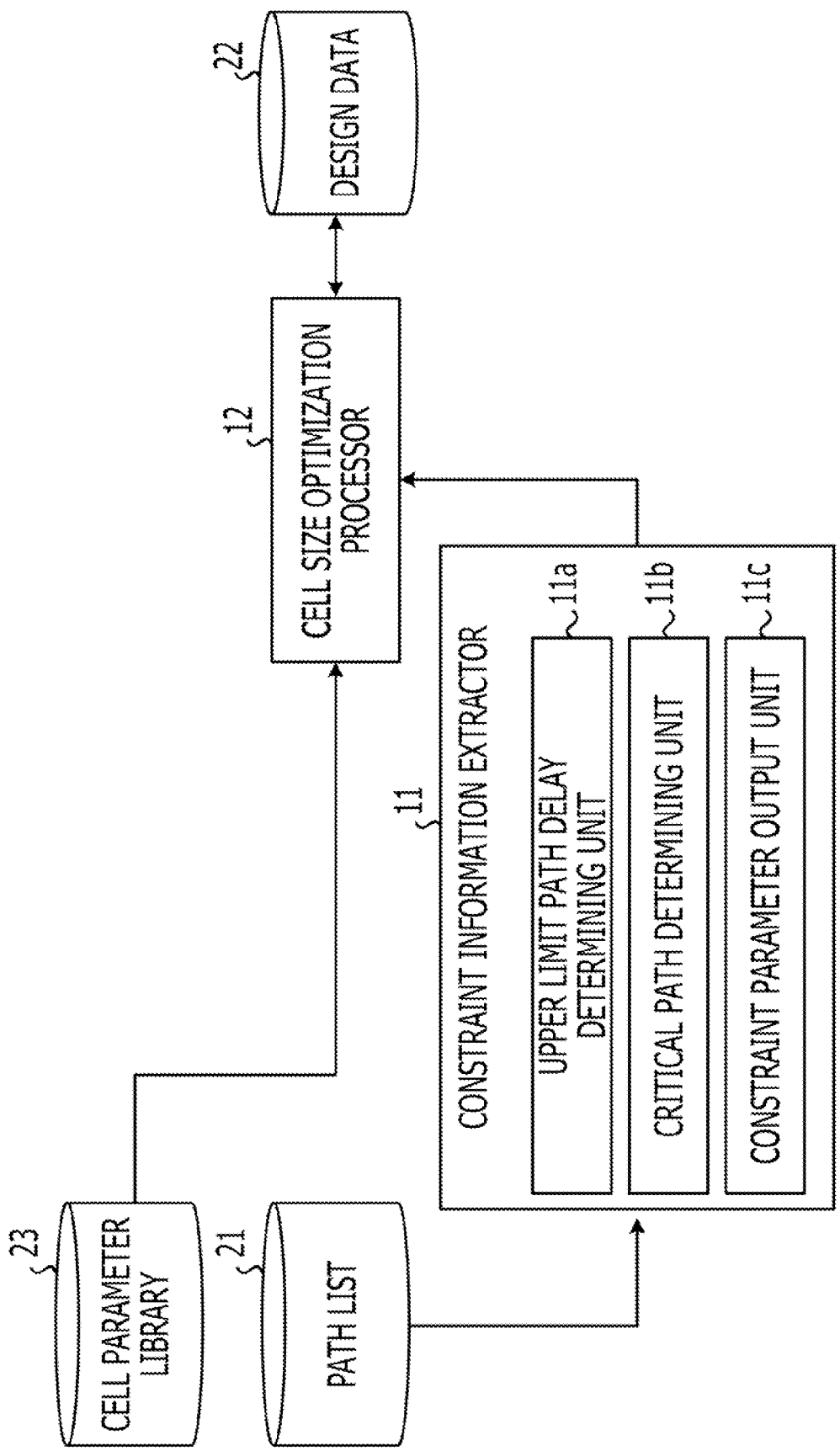
FIG. 3 illustrates an exemplary schematic configuration of the circuit design support apparatus of the second embodiment.

FIG. 3 illustrates an exemplary schematic configuration of the circuit design support apparatus of the first embodiment. The circuit design support apparatus illustrated in FIG. 3 includes a constraint information extractor 11 and a cell size optimization processor 12. The constraint information extractor 11 may be internally provided with an upper limit path delay determining unit 11a, a critical path determining unit 11b, and a constraint parameter output unit 11c.

The upper limit path delay determining unit 11a sorts a list of paths within the semiconductor integrated circuit stored in a path list 21. The paths are sorted on the basis of probability distributions for the delays produced when respective paths are operational. On the basis of the delay distribution for the worst path, the upper limit path delay determining unit 11a determines the upper limit path delay.

On the basis of the upper limit path delay determined by the upper limit path delay determining unit 11a, the critical path determining unit 11b determines the critical paths. The critical paths are the paths among the entire path set that may possibly affect the operational timing of the semiconductor integrated circuit as a whole, if cells on those paths were to be replaced with smaller cells, or at least modified to become smaller.

The constraint parameter output unit 11c takes constraint parameters in the form of the upper limit path delay determined by the upper limit path delay determining unit 11a, and the critical paths determined by the critical path determining unit 11b. The constraint parameter output unit 11c then outputs these constraint parameters to the cell size optimization processor 12.

The cell size optimization processor 12 references design data 22 and a cell parameter library 23, optimizes cell sizes, and updates the design data 22. More specifically, the waveforms of driven signals might be distorted as a result of insufficient drivability in particular cells, and the path delay might be increased. In such cases, the cell size optimization processor 12 optimizes cell sizes by increasing the cell size of such cells to increase their drivability, for example. By optimizing cell sizes with the use of the constraint parameters received from the constraint information extractor 11, it becomes possible to optimize cell sizes without affecting the operational timing of the semiconductor integrated circuit as a whole.

Figure 4:
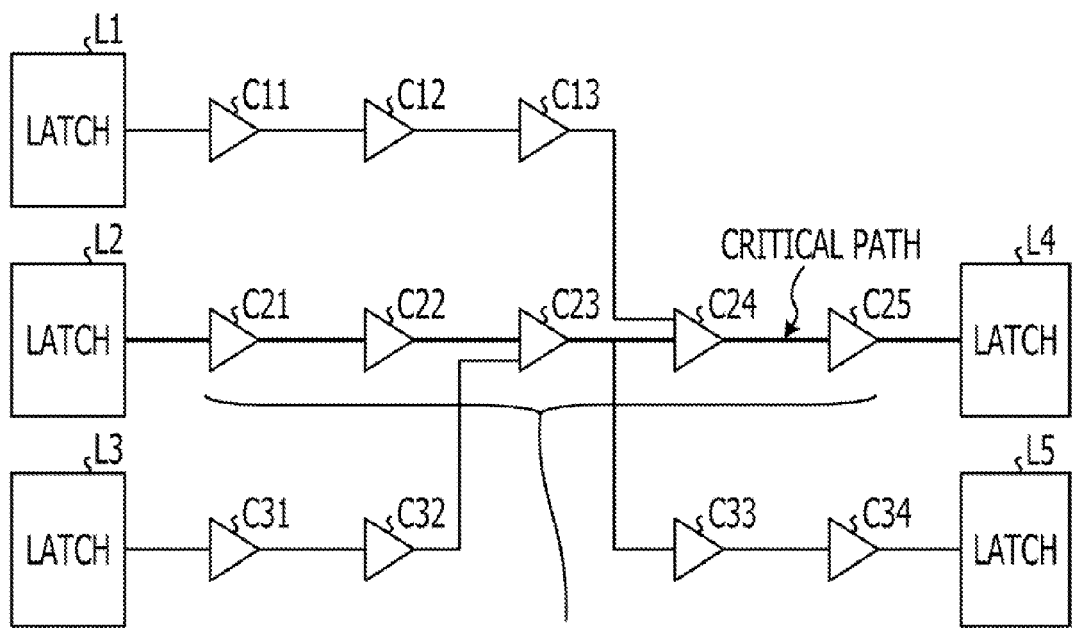
FIG. 4 is an example of optimization constraints with respect to cells.

FIG. 4 is an example of optimization constraints with respect to cells. In the example illustrated in FIG. 4, paths connecting latches L1 to L5 are illustrated. In addition, cells C11 to C13, C21 to C25, and C31 to C34 are respectively disposed on the paths.

In the example illustrated in FIG. 4, the path from latch L2 to latch L4 is a critical path. If the cell sizes of cells on a critical path are made smaller, then there is a possibility that the operational timing of the semiconductor integrated circuit as a whole might worsen. More specifically, if the cell sizes are made smaller, then the drivability may be insufficient for those cells, and a delay may increase as a result of distortion in the output waveform. For this reason, cell modifications may not be made that would increase path delay for cells on critical paths. In other words, cell modifications may not be made that would decrease the cell sizes of such cells.

For all paths other than the critical paths described above, cell sizes can be increased or decreased without affecting the operational timing of the semiconductor integrated circuit as a whole. In other words, such paths are non-critical paths. However, even if a cell is on a non-critical path, that cell might be shared with a critical path. For such cells, cell modifications may not be made that would increase path delay. In other words, cell modifications may not be made that would decrease the cell sizes of such cells.

For example, the path that leads from latch L1 to latch L4 via the cells C11 to C13 and C24 to C25 is a non-critical path. Among the cells on this path, increasing and decreasing the cell sizes is allowed for optimization of any of cells C11 to C13. In contrast, the cells C24 to C25 are used by a critical path, and since these cells are shared by a critical path and a non-critical path, modification to smaller cell sizes is prohibited.

Similarly, the path that leads from latch L2 to latch L5 via the cells C21 to C23 and C33 to C34 is also a non-critical path. Among the cells on this non-critical path, modification to smaller cell sizes is prohibited for cells C21 to C23, while modification to larger or smaller cell sizes is allowed for cells C33 to C34.

Furthermore, the path that leads from latch L3 to latch L4 via the cells C31 to C32 and C23 to C25 is also a non-critical path. Among the cells on this non-critical path, modification to smaller cell sizes may not be made for cells C23 to C25, while modification to larger or smaller cell sizes may be made for cells C31 to C32.

Similarly, the path that leads from latch L3 to latch L5 via the cells C31 to C32, C23, and C33 to C34 is also a non-critical path. Among the cells on this non-critical path, modification to smaller cell sizes may not be made for cell C23, while modification to larger or smaller cell sizes may be made for cells C31 to C32 and C33 to C34.

In this way, if modification to smaller cell sizes is not made for cells on critical paths, then cell sizes can be optimized without affecting the operational timing of the circuit as a whole. It should be appreciated that it is possible for a non-critical path to become a critical path if the operational frequency becomes too low as a result of replacing cells on a non-critical path. Thus, the parameter applied to cell replacement on non-critical paths constrains modification such that the path delay does not exceed the upper limit path delay after cell size modification.

Figure 5:
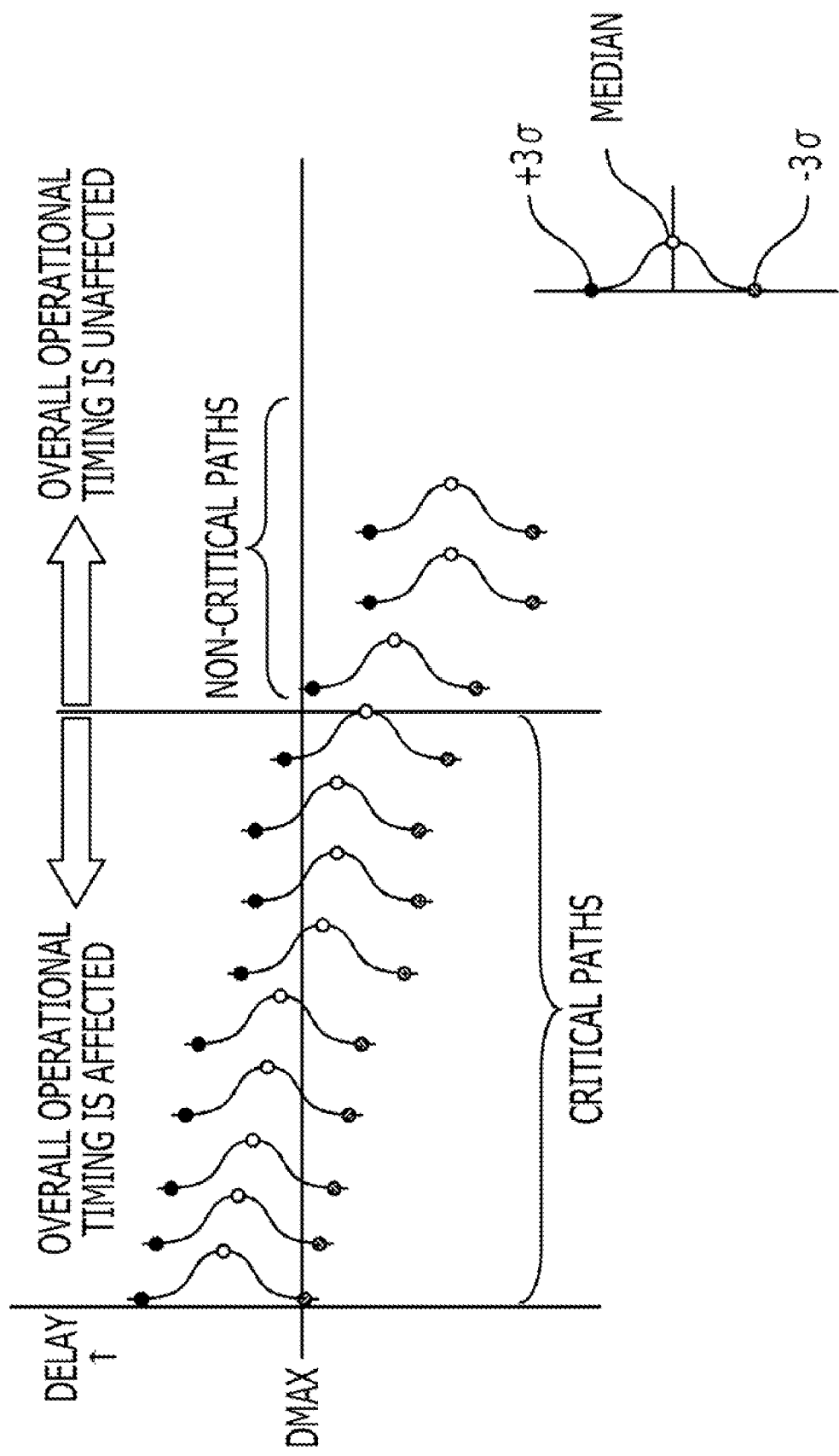
FIG. 5 is an example of the determination of the upper limit path delay and critical paths.

FIG. 5 is an example of the determination of the upper limit path delay and critical paths. In the example illustrated in FIG. 5, a path list has been sorted by the median values of the path delay distributions. In the path list sorting results, the path with the largest median value for its delay distribution becomes the worst path. The upper limit path delay determining unit 11a takes the $3\sigma$ value on the low side of the delay distribution (i.e., the $3\sigma$-fast value) for the worst path, and sets this value as the upper limit path delay Dmax. The $3\sigma$ value is computed from the mean and the standard deviation of the path delay distribution. More specifically, $3\sigma$-fast is the value obtained by subtracting three standard deviations from the mean of the path delay distribution, while $3\sigma$-slow is the value obtained by adding three standard deviations to the mean of the path delay distribution. If the probability distribution follows a normal distribution, then 99.7% of the delay distribution may be contained between the two $3\sigma$ values (i.e., between $3\sigma$-fast and $3\sigma$-slow).

For some paths in the semiconductor integrated circuit, the $3\sigma$ value on the high side of the delay probability distribution (i.e., the $3\sigma$-slow value) is greater than the $3\sigma$-fast value for the worst path. Such paths are critical paths, and may possibly affect the delay distribution for the worst path. In other words, paths whose $3\sigma$-slow value is greater than the $3\sigma$-fast value of the worst path may possibly affect the operational timing of the semiconductor integrated circuit as a whole. Paths whose $3\sigma$-slow value is less than the $3\sigma$-fast value of the worst path are non-critical paths, and the cell sizes of cells on such paths can be increased or decreased without affecting the delay distribution of the worst path.

Figure 6:
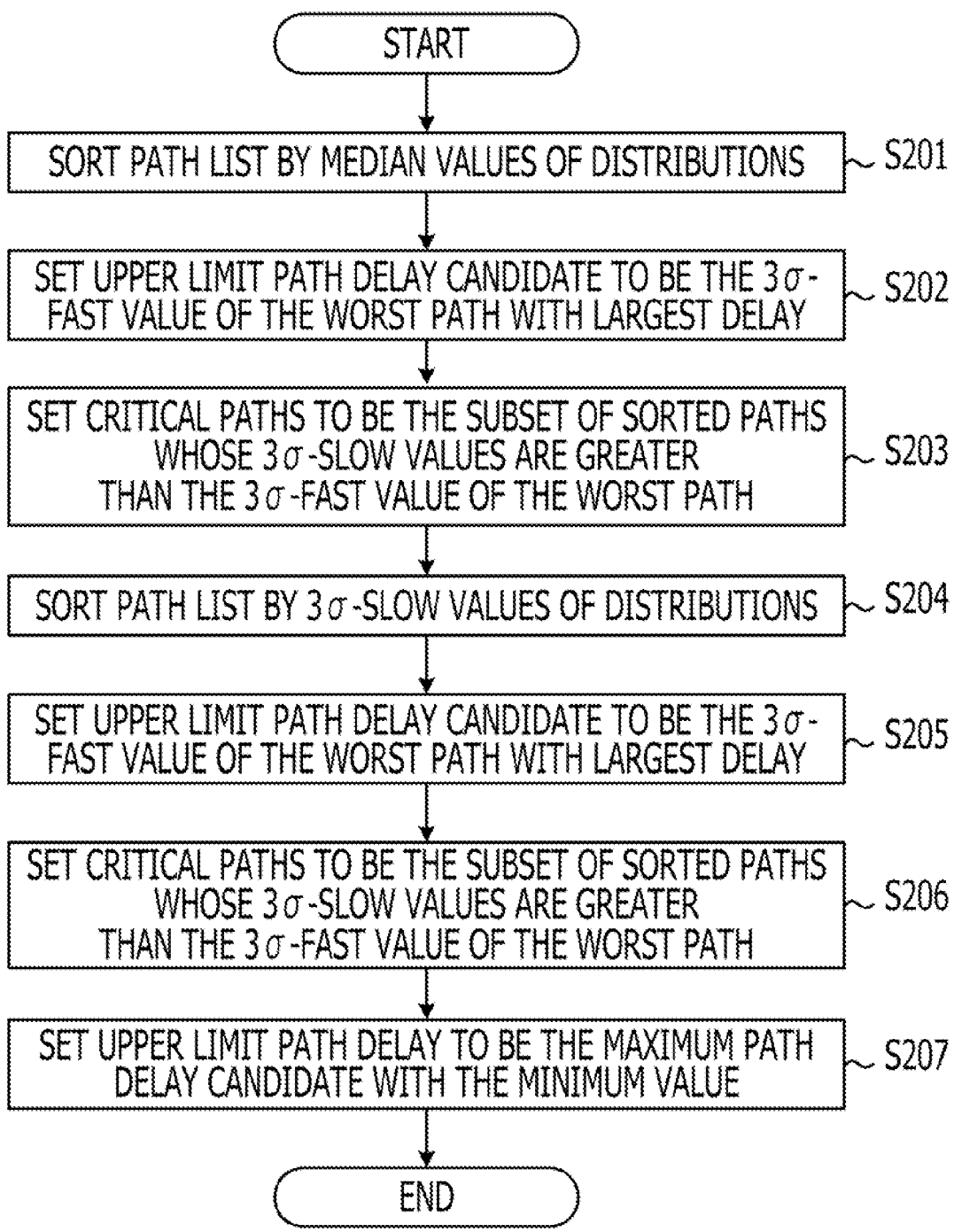
FIG. 6 is a flowchart of an exemplary modification of constraint parameter determination.

FIG. 6 is a flowchart of an exemplary modification of constraint parameter determination. In the circuit design support method illustrated in FIG. 6, the constraint information extractor 11 first sorts the path list by the median values of the delay distributions (S201). Next, the constraint information extractor 11 extracts the $3\sigma$-fast value of the worst path with the maximum delay according to the median sort, and sets this extracted value as a upper limit path delay candidate (S202).

Subsequently, the constraint information extractor 11 extracts critical paths from among the paths sorted in S201 (S203). The extracted critical paths are paths whose $3\sigma$-slow value is greater than the $3\sigma$-fast value of the worst path.

The constraint information extractor 11 then sorts the path list by the 3σ-slow values of the delay distributions (S204). Next, the constraint information extractor 11 extracts the 3σ-fast value of the worst path with the maximum delay according to the 3σ-slow sort, and sets this extracted value as a upper limit path delay candidate (S205).

Subsequently, the constraint information extractor 11 extracts critical paths from among the paths sorted in S201 (S206). The extracted critical paths are paths whose 3σ-slow value is greater than the 3σ-fast value of the worst path.

The constraint information extractor 11 then sets the maximum path delay candidate with the minimum value as the upper limit path delay (S207).

If the semiconductor integrated circuit is a processor, for example, then the numbers of series of circuit elements on each of the plurality of paths contained within the circuit may be respectively close, and there will be little deviance in the path distribution. For this reason, operations S203 to S206 may be omitted in such cases.

As described above, the circuit design support method and circuit design support apparatus in accordance with the first embodiment compute an upper limit path delay and critical paths from the delay distributions of paths within a semiconductor integrated circuit. From the upper limit path delay and the critical paths, there are computed constraint parameters which are used to optimize cell sizes without affecting the operational timing of the semiconductor integrated circuit as a whole. Thus, cell size optimization can be supported without affecting the operational frequency of the circuit as a whole.

Optimizing cell sizes without affecting the operational frequency of the circuit as a whole may be conducted for multiple objectives, such as those related to the performance and power consumption of the semiconductor integrated circuit, as well as for securing path delay margins. When design refinements made to achieve such objectives produce conflicting results, the foregoing becomes an effective design aid.

By securing path delay margins during the design process, timing yield during fabrication of semiconductor integrated circuits can be improved, and fabrication costs can be lowered. The improvement of timing yield is also effective in reducing the number of design operations as well as design costs. In other words, the improvement of timing yield is also effective in reducing the time and cost involved until design convergence is achieved.

Figure 7:
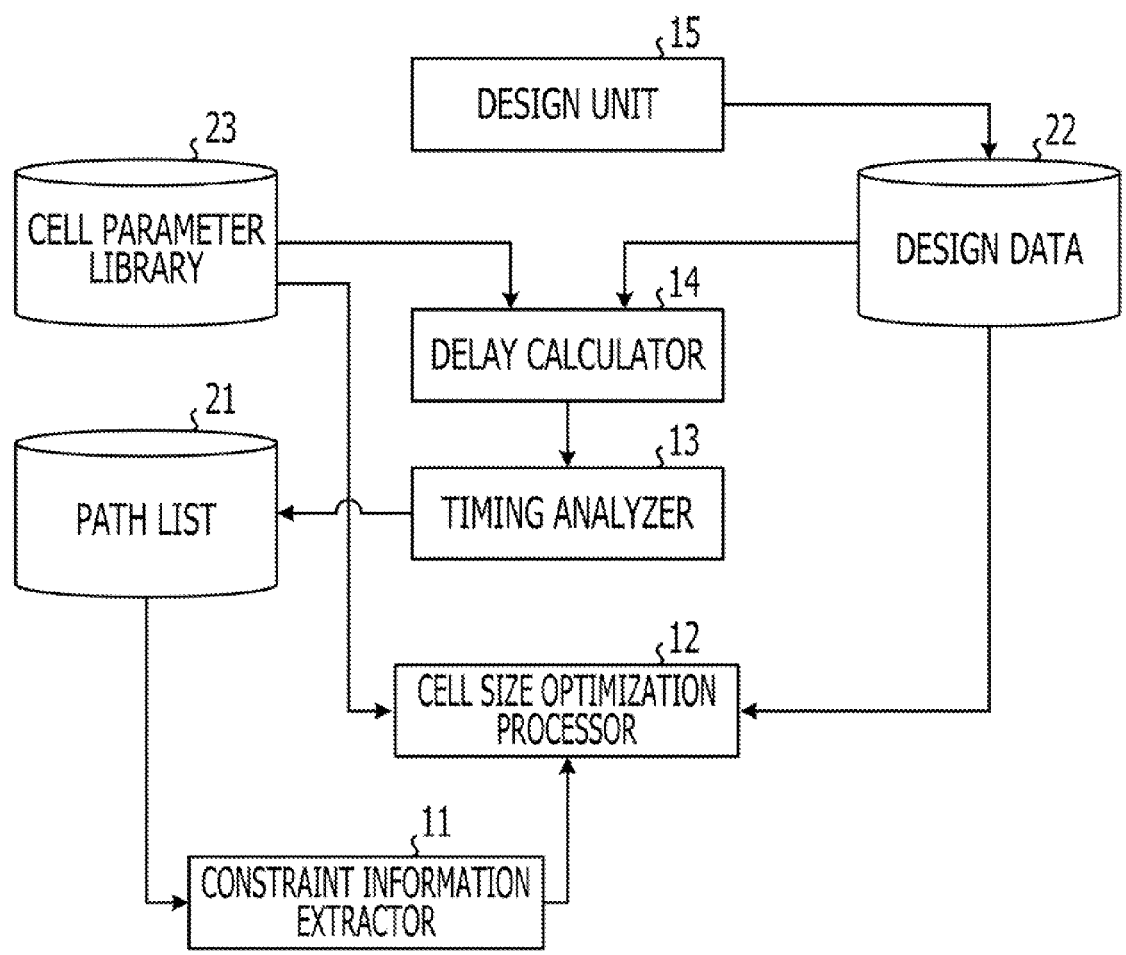
FIG. 7 illustrates an exemplary schematic configuration of the circuit design support apparatus of the second embodiment.

FIG. 7 illustrates an exemplary schematic configuration of the circuit design support apparatus in accordance with the second embodiment. The circuit design support apparatus illustrated in FIG. 7 includes a constraint information extractor 11, a cell size optimization processor 12, a timing analyzer 13, a delay calculator 14, and a design unit 15.

The design unit 15 designs a semiconductor integrated circuit on the basis of user input, and creates design data 22. The designing conducted by the design unit 15 may include logical designing, cell arrangement, and wiring processing.

The delay calculator 14 computes a delay distribution for each cell by using the design data 22 and the cell parameter library 23. The timing analyzer 13 uses the calculation results computed by the delay calculator 14 to conduct statistical timing analysis, and analyzes the operational timing of the semiconductor integrated circuit as a whole. In addition, the timing analyzer 13 registers the delay distribution of each path used for the timing analysis in the path list 21.

As described above for the first embodiment, the constraint information extractor 11 computes constraint parameters from the path list 21. The cell size optimization processor 12 then optimizes the cell sizes of respective cells on the basis of the constraint parameters. Therefore, cell sizes are optimized without affecting the operational timing of the semiconductor integrated circuit as a whole.

In this way, the circuit design support apparatus of the second embodiment analyzes the operational timing of the semiconductor integrated circuit as a whole, and by utilizing the path delay distributions created for analysis, the circuit design support apparatus is able to optimize cell sizes without affecting the operational timing of the semiconductor integrated circuit as a whole.

Furthermore, the cell size optimization processor 12 can be shared between two optimization processes, such as a cell size optimization process that does not affect the operational timing of the semiconductor integrated circuit as a whole, and a cell size optimization process that optimizes the operational timing of the semiconductor integrated circuit as a whole by improving the operational frequency of the semiconductor integrated circuit being designed, for example.

Figure 8:
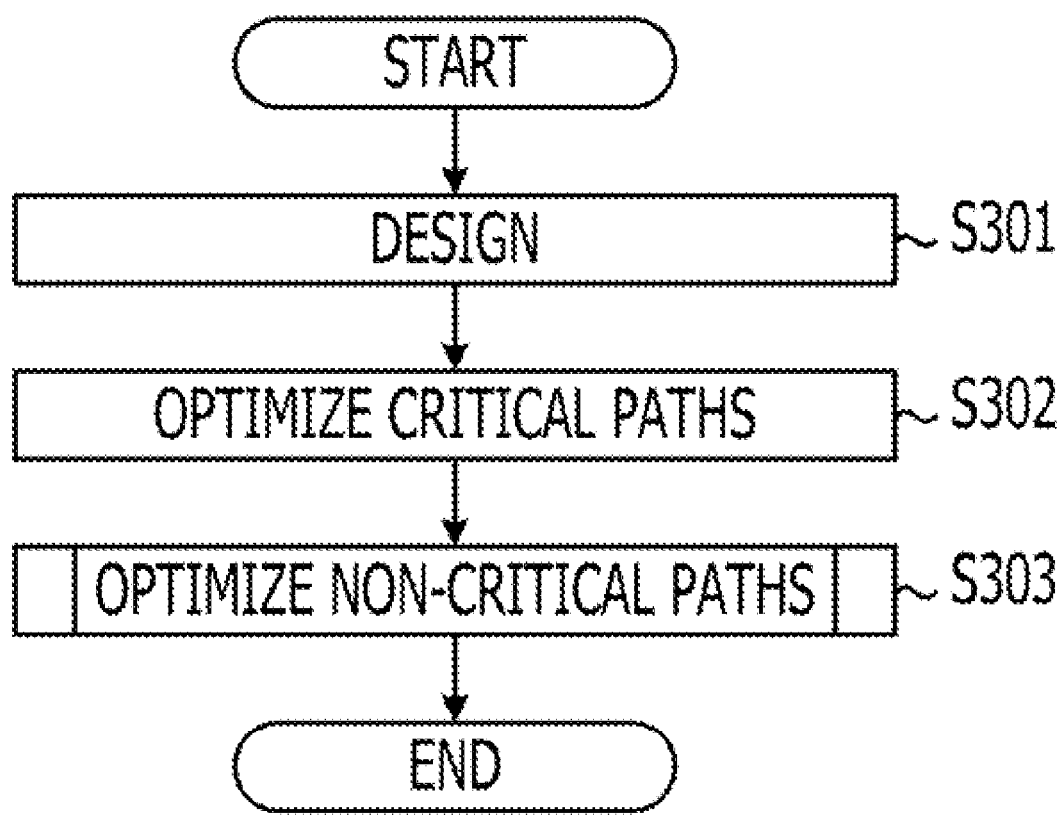
FIG. 8 is an example of processing operations by the circuit design support apparatus of the second embodiment.

FIG. 8 is an example of operations by the circuit design support apparatus of the second embodiment. As illustrated in FIG. 8, in the circuit design support apparatus disclosed of the second embodiment, first the design unit 15 creates design data 22 on the basis of user input (S301). Next, on the basis of the design data 22 and the cell parameter library 23, the cell size optimization processor 12 optimizes the cell sizes of cells included on critical paths (S302).

This process for optimizing cell sizes along critical paths may be a process of replacing cells in order to achieve a target value for the operational timing of the semiconductor integrated circuit as a whole. More specifically, cell sizes are increased along paths that have not achieved the target operational timing. Therefore, the cycle time is improved.

When the operational timing of the semiconductor integrated circuit as a whole has achieved the target value, the cell size optimization processor 12 terminates the process for optimizing cell sizes along critical paths, and overwrites the design data 22.

Subsequently, the cell size optimization processor 12 conducts a process for optimizing cell sizes along non-critical paths (S303). As described earlier, the optimization of non-critical paths may involve replacing cells while applying the constraint parameters obtained from the constraint information extractor 11.

This process for optimizing cell sizes along non-critical paths may be a process enabling cell sizes to be optimized without worsening the operational timing of the semiconductor integrated circuit as a whole, as described earlier. When the non-critical path optimization process finishes, the cell size optimization processor 12 overwrites the design data 22.

Figure 9:
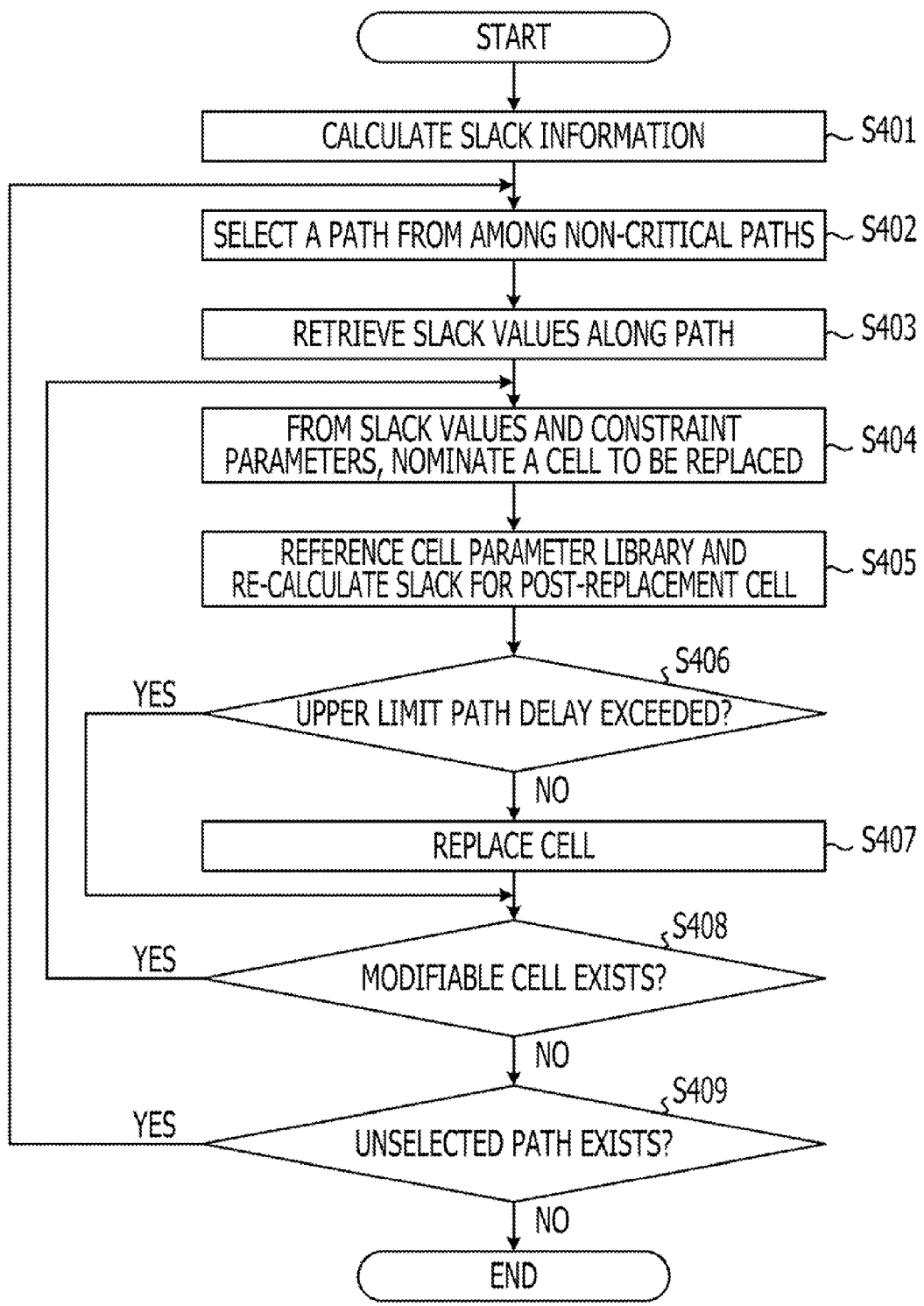
FIG. 9 is an exemplary flowchart explaining the details of a non-critical path optimization process.

FIG. 9 is an example flowchart of the details of the non-critical path optimization process. In the non-critical path optimization process, first slack information is calculated for each cell (S401). Slack information is information that indicates allowable amounts of delay with respect to the target cycle time along the paths that contain respective cells. In other words, the slack information indicates margin times with respect to target delay values or target racing values. If the slack information has been already computed in another process, such as the timing analysis, then the already computed slack information can be used. In such cases, the computation of slack information may be omitted at this point.

Next, on the basis of the constraint parameters, the cell size optimization processor 12 selects one of the non-critical paths as the target for cell size optimization (S402). The cell size optimization processor 12 retrieves the slack values along the selected path (S403), and on the basis of the slack values and the constraint parameters, provisionally determines a cell to be replaced (S404).

Subsequently, the cell size optimization processor 12 references the cell parameter library 23 and re-calculates slack values for the case where the above cell has been replaced (S405). The cell size optimization processor 12 then uses the re-calculated slack value results to determine whether or not the re-calculated path delay exceeds the upper limit path delay (S406). If the path delay is not more than the upper limit path delay (S406, No), then the cell size optimization processor 12 replaces the cells that were provisionally determined in S404 (S407). If the path delay exceeds the upper limit path delay (S406, Yes), then the cell size optimization processor 12 cancels replacement of the provisionally determined cell.

Subsequently, the cell size optimization processor 12 determines whether or not there exist other cells with modifiable cell sizes along the selected path (S408). If there does exist another cell with a modifiable cell size along the selected path (S408, Yes), then the cell size optimization processor 12 returns to operation S404.

If there does not exist another cell with a modifiable cell size along the selected path (S408, No), then the cell size optimization processor 12 determines whether or not an unselected path exists among the non-critical paths (S409). If an unselected non-critical path does exist (S409, Yes), then the cell size optimization processor 12 returns to operation S402.

Once the cell size optimization process has finished for all non-critical paths (S409, No), the cell size optimization processor 12 terminates the process for optimizing cell sizes along non-critical paths.

As described above, by utilizing path delay distributions created for analysis of the operational timing of the semiconductor integrated circuit as a whole, the circuit design support apparatus disclosed of the second embodiment is able to optimize cell sizes without affecting the operational timing of the semiconductor integrated circuit as a whole.

In addition, in the circuit design support apparatus disclosed of the second embodiment, the cell size optimization processor is shared between a cell size optimization process for cells contained along critical paths, and a cell size optimization process for cells contained along non-critical paths. Therefore, an existing cell size optimization processor that optimizes cell sizes along critical paths can be utilized to optimize non-critical paths.

Figure 10:
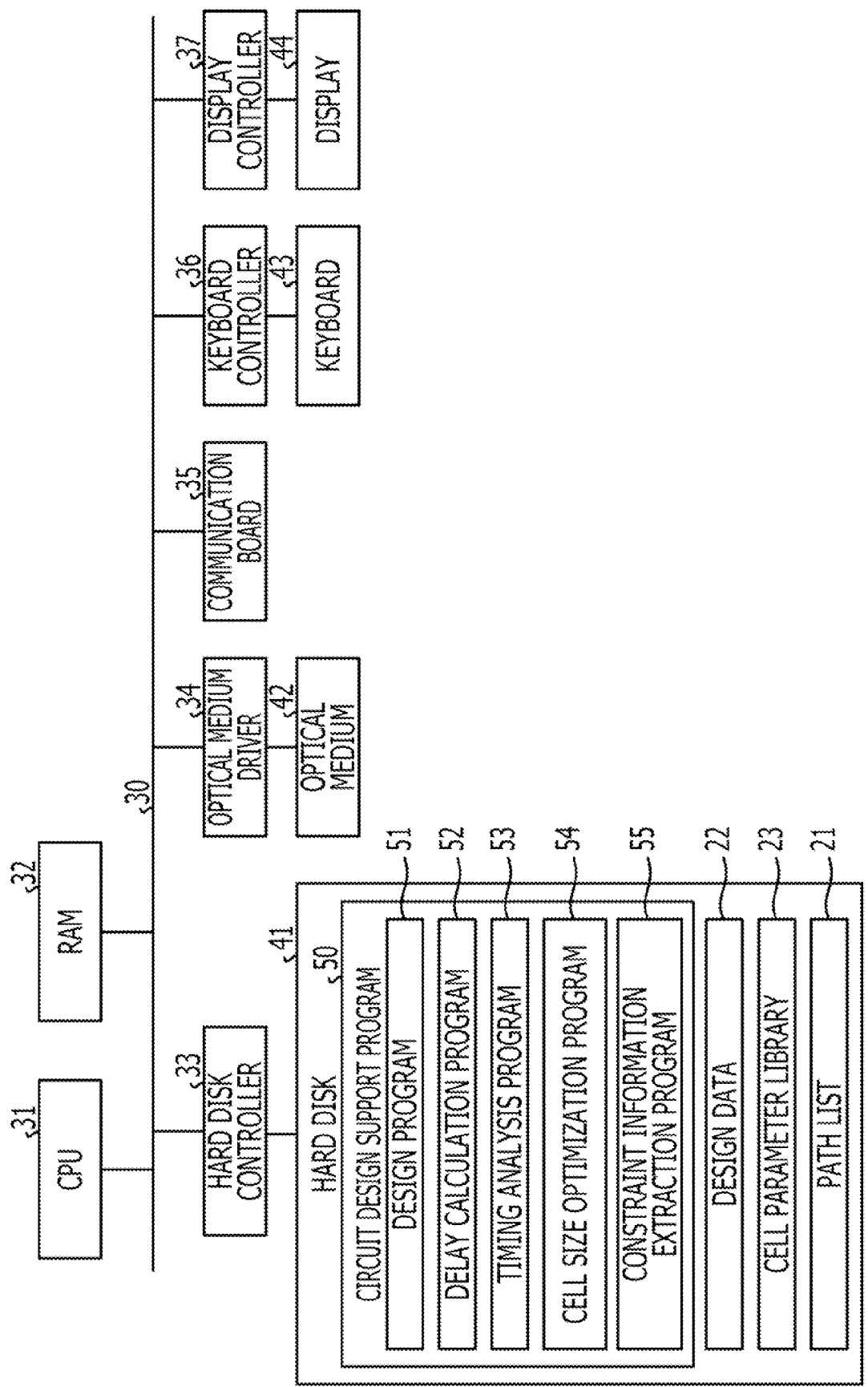
FIG. 10 is an example of the circuit design support program of the third embodiment.

FIG. 10 is an example of the circuit design support program in accordance with the third embodiment. In FIG. 10, a circuit design support program 50 is stored in the hard disk 41 of a computer system.

The computer system includes a central processing unit (CPU) 31, random access memory (RAM) 32, a hard disk controller 33, an optical medium driver 34, a communication board 35, a keyboard controller 36, and a display controller 37. The CPU 31, RAM 32, hard disk controller 33, optical medium driver 34, communication board 35, keyboard controller 36, and display controller 37 are respectively connected to a bus 30.

The hard disk controller 33 is also connected to the hard disk 41. The optical medium driver 34 is an apparatus that access an optical medium 42 such as a compact disc (CD), a Digital Versatile Disc (DVD), or a Blu-ray Disc™ (BD).

The communication board 35 is a communication apparatus that communicates using an arbitrary communication protocol. The keyboard controller 36 is connected to a keyboard 43, and accepts user input. In addition, the display controller 37 is an output interface that controls display output with respect to a display 44.

In the example illustrated in FIG. 10, the hard disk 41 respectively stores the circuit design support program 50, the design data 22, the cell parameter library 23, and the path list 21.

The circuit design support program 50 respectively includes a design program 51, a delay calculation program 52, a timing analysis program 53, a cell size optimization program 54, and a constraint information extraction program 55.

The CPU 31 reads the circuit design support program 50 into the RAM 32 and executes the circuit design support program 50. As a result of being executed by the CPU 31, the circuit design support program 50 may function as the design unit described in the second embodiment. As a result of being executed by the CPU 31, the delay calculation program 52 may function as the delay calculator described in the second embodiment. As a result of being executed by the CPU 31, the timing analysis program 53 may function as the timing analyzer described in the second embodiment. As a result of being executed by the CPU 31, the cell size optimization program 54 may function as the cell size optimization processor described in the second embodiment. As a result of being executed by the CPU 31, the constraint information extraction program 55 may function as the constraint information extractor described in the second embodiment.

Consequently, as a result of the CPU 31 executing the circuit design support program 50, the computer system may operate as the circuit design support apparatus disclosed in the embodiments. For example, regarding the circuit design support apparatus as described in the first embodiment (FIG. 3), the cell size optimization processor 12 may be implemented by the CPU 31 executing a cell size optimization program 54. Likewise, the path list 21, design date 22, and cell parameter library 23 may reside in the hard disk 41 and/or optical medium 42 and accessible by CPU 31 via an upload through the RAM 32, if desired. As for the constraint information extractor 11 and units therein, they may be implemented through execution by the CPU 31 of a computer program 55 that may also reside in the hard disk drive 41, or alternatively in the optical medium 42.

As described above, the circuit design support program disclosed in the third embodiment is able to cause an arbitrary computer system to operate as a circuit design support apparatus. In the third embodiment, the circuit design support program is described by way of example as being stored in a hard disk 41. However, it should be appreciated that the circuit design support program may be stored in an arbitrary recording medium that is readable by a computer. Examples of such a recording medium include: an optical medium, such as a CD, DVD, or BD; a magneto-optical recording medium, such as a magneto-optical (MO) disc; a magnetic recording medium, such as a floppy disk; and flash memory.

All examples and conditional language recited herein are intended for pedagogical objects to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A circuit design support apparatus for supporting design of a semiconductor integrated circuit, comprising:
    an upper limit path delay determining unit that sorts circuit paths included in the semiconductor integrated circuit by probability distributions for delay values of the circuit paths, selects a worst path having a largest delay value in the circuit paths, and determines a maximum delay value as an upper limit path delay value that does not affect an operational timing of the semiconductor integrated circuit;
    a cell size optimization processor that modifies or replaces a cell to modify its cell size on the basis of the upper limit path delay value; and
    a critical path determining unit that determines critical paths that are capable of affecting the upper limit path delay value when the cell size optimization processor modifies or replaces cells included in the critical paths.

2. The circuit design support apparatus according to claim 1, wherein the cell size optimization processor specifies constraint parameters to modify or replace a cell included in one of the critical paths such that
    the cell sizes of the cells included in the one critical path are not made smaller than the cell sizes of the cells before the modifying or replacing, and
    when the cell sizes of cells not included in the critical paths are made smaller than the cell sizes of the cells before the modifying or replacing, the delay of the one non-critical path that include the modified or replaced cells does not exceed the upper limit path delay value.

3. The circuit design support apparatus according to claim 2, wherein the cell size optimization processor replaces cells on the basis of the constraint parameters.

4. The circuit design support apparatus according to claim 1, wherein the upper limit path delay determining unit
    sorts the circuit paths by median values of the probability distributions, or by values obtained by adding three standard deviations to a mean of the probability distributions, and
    selects the worst path from the sorted paths, wherein the worst path is a circuit path with a largest delay.

5. The circuit design support apparatus according to claim 1, wherein the upper limit path delay determining unit determines the upper limit path delay to be a value obtained by subtracting three standard deviations from a mean of the probability distributions of the worst path.

6. The circuit design support apparatus according to claim 1, wherein the critical path determining unit determines a critical path to be the circuit paths for which a value obtained by adding three standard deviations to a mean of the probability distributions is greater than a delay value of the worst path.

7. A circuit design support method of supporting design of a semiconductor integrated circuit, performed by a processor, comprising:
    sorting circuit paths included in the semiconductor integrated circuit by probability distributions for delay values of the circuit paths;
    selecting a worst path having a largest delay value in the circuit paths;
    determining a maximum value as an upper limit path delay value that does not affect an operational timing of the semiconductor integrated circuit;
    replacing cells by modifying or replacing their cell sizes on the basis of the upper limit path delay value; and
    determining paths as critical paths that are capable of affecting the upper limit path delay value if the cell sizes of cells included in the critical paths are replaced in the replacing.

8. The circuit design support method according to claim 7, further comprising specifying constraint parameters such that
    the cell sizes of cells included in one critical path is not made smaller than the cell sizes of the cells before the modifying or replacing, and
    when the cell sizes of cells not included in the one critical path is made smaller than the cell sizes of the cells before the modifying or replacing, the delay of the paths that include the replaced cells does not exceed the upper limit path delay value.

9. The circuit design support method according to claim 8, further comprising:
    replacing the cells on the basis of the constraint parameters.

10. The circuit design support method according to claim 7, wherein the worst path is selected by
    sorting the circuit paths by median values of the delay probability distributions, or by values obtained by adding three standard deviations to a mean of the probability distributions, and
    selecting a worst path from the circuit paths, wherein the worst path is a path with a largest delay.

11. The circuit design support method according to claim 7, wherein the upper limit path delay is determined to be a value obtained by subtracting three standard deviations from a mean of the probability distributions of the selected worst path.

12. The circuit design support method according to claim 7, wherein critical paths are determined to be the paths for which a value obtained by adding three standard deviations to a mean of the probability distribution is greater than a delay value of the selected worst path.

13. A non-transitory computer-readable recording medium storing a circuit design support program that causes a computer to execute a process for supporting design of a semiconductor integrated circuit, the process comprising:
    sorting circuit paths included in the semiconductor integrated circuit by probability distributions for delay values of the circuit paths;
    selecting a worst path having a largest delay value in the circuit paths;
    determining a maximum value as an upper limit path delay value that does not affect an operational timing of the semiconductor integrated circuit;
    replacing cells by modifying or replacing their cell sizes on the basis of the upper limit path delay value; and
    determining paths as critical paths that are capable of affecting the upper limit path delay value if the cell sizes of cells included in the critical paths are replaced in the replacing.

14. The computer-readable recording medium according to claim 13, further comprising specifying constraint parameters such that
    the cell sizes of cells included in one critical path is not made smaller than the cell sizes of the cells before the modifying or replacing, and
    when the cell sizes of cells not included in the one critical path is made smaller than the cell sizes of the cells before the modifying or replacing, the delay of the paths that include the replaced cells does not exceed the upper limit path delay value.

15. The computer-readable recording medium according to claim 14, the process further comprising:
  replacing the cells on the basis of the constraint parameters.

16. The computer-readable recording medium according to claim 13, wherein
  the worst path is selected by
  sorting the circuit paths by median values of the delay probability distributions, or by values obtained by adding three standard deviations to a mean of the probability distributions, and
  selecting a worst path from the circuit paths, wherein the worst path is a path with a largest delay.

17. The computer-readable recording medium according to claim 13, wherein
  the upper limit path delay is determined to be a value obtained by subtracting three standard deviations from a mean of the probability distributions of the selected worst path.

18. The computer-readable recording medium according to claim 13, wherein
  the critical paths are determined to be the circuit paths for which a value obtained by adding three standard deviations to a mean of the probability distributions is greater than a delay value of the worst path.

* * * * *